No. 799,765. PATENTED SEPT. 19, 1905.
A. W. TWEEDEN.
ANTIFRICTION THRUST PLATE.
APPLICATION FILED FEB. 16, 1905.

WITNESSES:
M. C. Van House
Paul T. Shaw

INVENTOR.
Andrew W. Tweeden
by R. J. Elliott
ATTORNEY.

UNITED STATES PATENT OFFICE.

ANDREW W. TWEEDEN, OF TACOMA, WASHINGTON.

ANTIFRICTION THRUST-PLATE.

No. 799,765. Specification of Letters Patent. Patented Sept. 19, 1905.

Application filed February 16, 1905. Serial No. 245,908.

*To all whom it may concern:*

Be it known that I, ANDREW W. TWEEDEN, a citizen of the United States of America, residing at Tacoma, in the county of Pierce and State of Washington, have invented certain new and useful Improvements in Antifriction Thrust-Plates, of which the following is a specification, reference being had therein to the accompanying drawings.

This invention relates to antifriction thrust-plates, and has for its object to reduce the wear on plates which are placed on a revolving shaft between two surfaces and which have to travel along said shaft and to transmit pressure between said surfaces.

My invention is illustrated in the accompanying drawings, in which—

Figure 1:
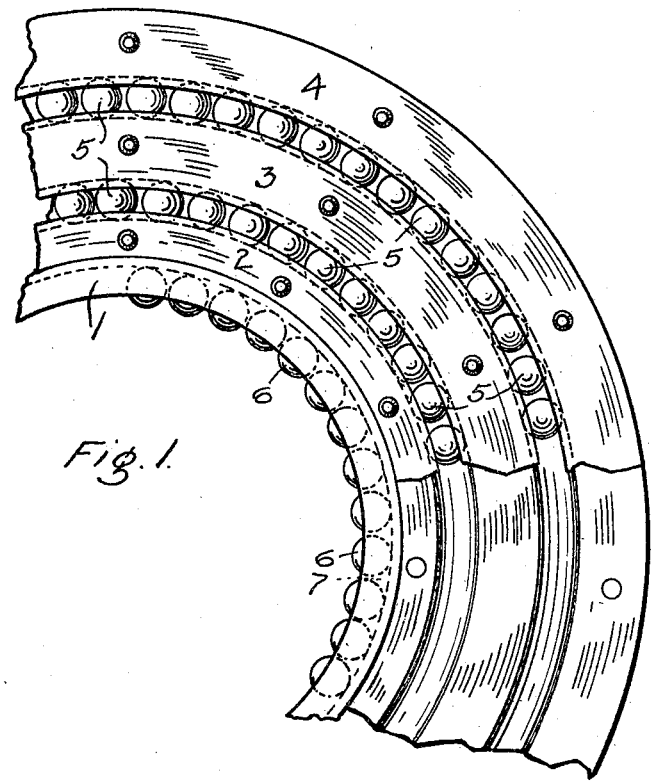
Figure 2:
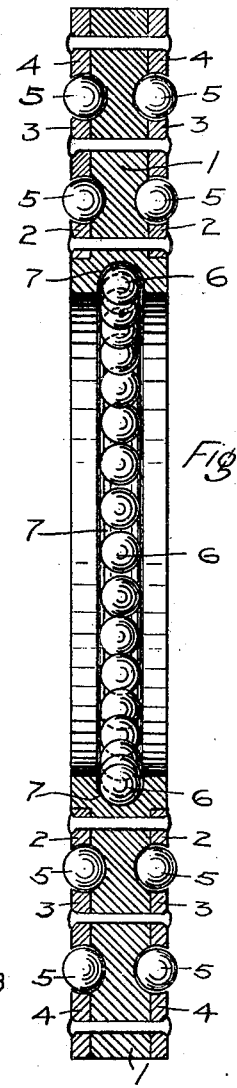
Figure 3:
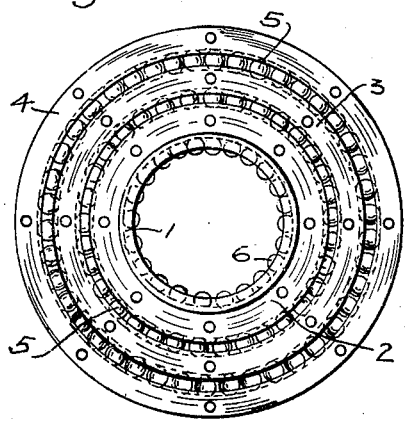

Figure 1 is a front view of a portion of my device. Fig. 2 is a cross-section thereof. Fig. 3 is a front view on a smaller scale, and Fig. 4 is a section showing my device as applied to the drum of a hoist.

Similar numerals of reference refer to similar parts throughout the several views.

My invention consists of an annular body 1, having a shoulder of greater thickness around the central hole and having supplementary pairs of rings 2, 3, and 4 secured to its faces and having balls 5, retained in place by said rings, and also an inner set of balls 6 within a recess 7, opening around the central hole. The recess 7 is constructed so that its sides will allow the balls to be inserted in place, but will not allow them to slip out sidewise when the plate is in use. These balls 6 support the annulus 1 on the shaft and allow it to have perfectly free motion around the shaft and also along the shaft. The rings 2 are fitted around the shoulders of the annulus and have their outer edges concaved, so as to act in conjunction with the oppositely-concaved surfaces on the next rings 3 to form channels in which the balls 5 roll freely, but from which they cannot fall. The surface of the annulus 1 may also be grooved slightly, if necessary, along the path of the balls 5. Similarly the outer edges of the rings 3 are concaved to form a passage for an outer row of balls 5 in conjunction with the oppositely-concaved edges of the outer rings 4. The outer rings 4 are concaved only on their inner edges. All these rings 2, 3, and 4 are securely fastened by rivets or otherwise to the annulus 1. The balls 5 transmit the side pressure practically without friction, and as they are applied to both sides of the annulus it is evident that they will turn less rapidly, and therefore with less friction than would be the case if the annulus was not free to revolve and the balls merely pressed against the adjacent revolving surface.

Figure 4:
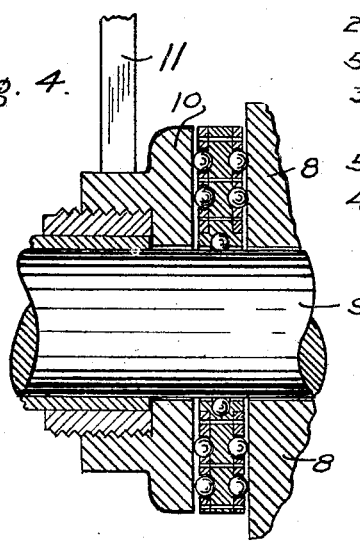

In Fig. 4 I have illustrated one application of my improved antifriction-plate in which it is placed next to a drum 8 of a hoisting-engine, the said drum being loose on the shaft 9. The pressure is produced by the screw-casting 10, operated by the lever 11 and having a flat surface bearing against one set of the balls 5. The other set of balls 5 press against the surface of the drum 8. When the lever 11 is moved, the casting 10 forces the annulus to roll along the revolving shaft 9 on the balls 6 until the balls 5 press the side of the drum 8. Then as the drum 8 is moved sidewise on the shaft 9 it comes in contact with its friction driving mechanism and revolves, and as there is practically no friction between the casting 10 and the drum 8 the operator can regulate the amount of friction between the drum and its driving mechanism with great nicety. Further, the effort required to accomplish this is very materially reduced.

Having described my invention, what I claim is—

1. An antifriction-plate comprising an annulus with a groove surrounding and communicating with the central hole thereof, grooves concentric with said central hole and having converging sides whereby balls are retained therein, and balls operating freely in all said grooves.

2. An antifriction-plate comprising an annulus with a central flange surrounding the central hole thereof, a groove in said annulus and surrounding and communicating with the said central hole thereof, concentric rings secured to said annulus and separated from each other and having converging sides whereby balls are retained in the spaces therebetween, and balls operating freely in said groove and in the spaces between said concentric rings.

3. In a thrust-plate, an annulus surrounding its supporting-shaft, antifriction means between said shaft and said annulus whereby said annulus may freely move around and along said shaft, and antifriction means on the sides of said annulus whereby pressure is transmitted parallel with said shaft between a stationary pressure-block and a revolving body.

In testimony whereof I affix my signature in presence of two witnesses.

ANDREW W. TWEEDEN.

Witnesses:
 ALEXANDER REITH,
 G. C. CALENTINE.